United States Patent
Kobayashi et al.

(10) Patent No.: US 7,666,268 B2
(45) Date of Patent: Feb. 23, 2010

(54) GREEN SHEET COATING MATERIAL, GREEN SHEET, PRODUCTION METHOD OF GREEN SHEET AND PRODUCTION METHOD OF ELECTRONIC DEVICE

(75) Inventors: Hisashi Kobayashi, Chuo-ku (JP); Shigeki Satou, Chuo-ku (JP)

(73) Assignee: TDK Corporation, Tokyo (JP)

( * ) Notice: Subject to any disclaimer, the term of this patent is extended or adjusted under 35 U.S.C. 154(b) by 288 days.

(21) Appl. No.: 10/571,348

(22) PCT Filed: Aug. 26, 2004

(86) PCT No.: PCT/JP2004/012294
§ 371 (c)(1), (2), (4) Date: Mar. 10, 2006

(87) PCT Pub. No.: WO2005/026078
PCT Pub. Date: Mar. 24, 2005

(65) Prior Publication Data
US 2007/0039680 A1    Feb. 22, 2007

(30) Foreign Application Priority Data
Sep. 12, 2003    (JP)    ............................. 2003-320948

(51) Int. Cl.
C03B 29/00 (2006.01)
C04B 33/34 (2006.01)
C04B 33/32 (2006.01)
C04B 33/36 (2006.01)
C04B 35/64 (2006.01)
B28B 1/00 (2006.01)
B28B 3/00 (2006.01)
B28B 5/00 (2006.01)

(52) U.S. Cl. ................. 156/89.12; 156/89.16; 264/650; 264/670

(58) Field of Classification Search .............. 156/89.12, 156/89.16; 264/650, 670
See application file for complete search history.

(56) References Cited

U.S. PATENT DOCUMENTS
3,926,918 A * 12/1975 Shibata et al. ............... 525/61
3,953,562 A * 4/1976 Hait et al. ...................... 264/83

(Continued)

FOREIGN PATENT DOCUMENTS
JP    1-226141    *    9/1989

(Continued)

OTHER PUBLICATIONS
John Burke, "Hildebrand Solubility Parameter", Aug. 1984, pp. 1-5, http://web.archive.org/web/19990219111537/http://palimpsest.stanford.edu/byauth/burke/solpar/solpar2.html.*

Erich Salomonowtiz et al., "Hydrophilic-Lipophilic Balance as Predictor of Mucus Coating with Barium Sulfate", 1986, Gastrointestinal Radiology, vol. 11, pp. 93-96.*

*Primary Examiner*—Philip C Tucker
*Assistant Examiner*—Michael N Orlando
(74) *Attorney, Agent, or Firm*—Oliff & Berridge, PLC

(57) ABSTRACT

A coating material, green sheet and the method capable of producing a green sheet without a pin hole, having enough strength to be peeled from a support body and excellent surface smoothness even when the green sheet is extremely thin, and being suitable to make an electronic device thin and multilayered, are provided. The present invention provides a green sheet coating material comprising a ceramic powder, a binder resin including a butyral based resin as a main component thereof, and a solvent. The solvent includes a first solvent having an SP value as a solubility parameter of 10 or larger and a second solvent having the SP value of 8 or larger but smaller than 10. The second solvent is included by 20 to 60 wt % and, preferably, 25 to 60 wt % with respect to 100 wt % of the solvent as the entire weight.

11 Claims, 2 Drawing Sheets

U.S. PATENT DOCUMENTS

| | | | |
|---|---|---|---|
| 4,080,414 A * | 3/1978 | Anderson et al. | 264/41 |
| 5,413,842 A * | 5/1995 | Felisberto et al. | 428/209 |
| 5,660,781 A * | 8/1997 | Moriya et al. | 264/212 |
| 5,893,954 A * | 4/1999 | Nanataki et al. | 156/89.11 |
| 6,589,446 B1 * | 7/2003 | Nakamura et al. | 252/363.5 |

FOREIGN PATENT DOCUMENTS

| | | | |
|---|---|---|---|
| JP | A 06-72760 | | 3/1994 |
| JP | A 06-206756 | | 7/1994 |
| JP | B2 2866137 | | 12/1998 |
| JP | 11-144992 | * | 5/1999 |
| JP | A 2000-335971 | | 12/2000 |
| JP | A 2001-114568 | | 4/2001 |
| JP | A 2001-167971 | | 6/2001 |
| JP | A 2001-181056 | | 7/2001 |
| JP | A 2003-176179 | | 6/2003 |
| JP | 2004-186396 | * | 7/2004 |

* cited by examiner

GREEN SHEET COATING MATERIAL, GREEN SHEET, PRODUCTION METHOD OF GREEN SHEET AND PRODUCTION METHOD OF ELECTRONIC DEVICE

TECHNICAL FIELD

The present invention relates to a green sheet coating material, a green sheet, a production method of a green sheet and a production method of an electronic device, and particularly relates to a coating material, green sheet and a method capable of producing a green sheet without a pin hole, having excellent surface smoothness even in the case of an extremely thin sheet and being suitable to making an electronic device a thin layer and multilayered.

BACKGROUND ART

In recent years, due to downsizing of a variety of electronic equipments, electronic devices to be installed inside the electronic equipments have become more compact and higher in performance. As one of the electronic devices, there is a ceramic electronic device, such as a CR built-in substrate and a multilayer ceramic capacitor, and the ceramic electronic devices have been required to be more compact and higher in performance.

To pursue a more compact ceramic electronic device having a higher capacity, there is a strong demand for making a dielectric layer thinner. Recently, a thickness of a dielectric green sheet composing a dielectric layer has become several μm or thinner.

To produce a ceramic green sheet, normally, a ceramic coating material composed of ceramic powder, a binder (an acrylic based resin and a butyral based resin, etc.), a plasticizer (phthalate esters, glycols, adipic acids, and phosphoric esters) and an organic solvent (toluene, MEK and acetone, etc.) is prepared. Next, the ceramic coating material is coated on a carrier sheet (a support body made by PET or PP) by using the doctor blade method, etc. and dried by heating.

Also, producing by preparing a ceramic suspension wherein the ceramic powder and binder are mixed in a solvent, then, performing two-dimensional drawing on the suspension to mold a film-shaped molded item has been considered in recent years.

A method of producing a multilayer ceramic capacitor by using the ceramic green sheet explained above will be explained in detail. An internal electrode conductive paste containing metal powder and a binder is printed to be a predetermined pattern on the ceramic green sheet and dried to form an internal electrode pattern. After that, the green sheet is peeled from the carrier sheet and stacked to be a desired number of layers. Here, two methods are proposed, that are a method of peeling the green sheet from the carrier sheet before stacking in layers and a method of peeling the carrier sheet after stacking in layers and adhering by compression, but there is not a great difference between them. Finally, the stacked body is cut to be a chip shape, so that green chips are prepared. After firing the green chips, external electrodes are formed, so that electronic devices, such as multilayer ceramic capacitors, are produced.

When producing a multilayer ceramic capacitor, an interlayer thickness of sheets to be formed with internal electrodes is in a range of 3 μm to 100 μm or so based on a desired capacitance required as a capacitor. Also, in a multilayer ceramic capacitor, a part not formed with internal electrodes is formed on an outer part in the stacking direction of the capacitor chip.

Generally, when a thickness of the green sheet becomes thin, there arise problems that smoothness on the surface of the sheet declines and stacking becomes difficult.

In recent years, along with downsizing of electronic equipments, electronic devices to be used therein have rapidly become more compact. In multilayer electronic devices as typified by a multilayer ceramic capacitor, rapid development has been made on an increase of the number of layers to be stacked and attaining a thinner interlayer thickness. To respond to the technical trends, a thickness of a green sheet, which determines the interlayer thickness, has almost become 3 μm or thinner to 2 μm or thinner. Therefore, in a production process of a multilayer ceramic capacitor, it is necessary to handle extremely thin green sheets and to design highly advanced green sheet properties.

As characteristics required as the properties of such an extremely thin green sheet, sheet strength, flexibility, smoothness, adhesiveness when being stacked, handlability (electrostatic property), etc. may be mentioned, and balance of a higher order is required.

Particularly, when the sheet becomes thin, roughness (unevenness) on the sheet surface cannot be ignored with respect to the thickness. Namely, change of surface condition which has not been considered in a thick sheet becomes change of a sheet thickness itself in the case of a thin layer sheet. It is anticipated that a recessed portion on the surface roughness has susceptibility to a voltage application at firing and causes short-circuiting. Therefore, to produce a sheet having smooth surface (= change of surface roughness is small) and a unified thickness is essential element technique in producing a multilayer chip capacitor.

Note that, as described in the patent article 1 below, there is known a technique of using a polyvinyl butyral resin having a polymerization degree of 1000 or higher as a binder in green sheet slurry containing an aqueous solvent for a purpose of eliminating a short-circuiting defect.

However, the patent article 1 is not for particularly attaining a thinner organic solvent based green sheet, and also has the problem that surface smoothness declines and stacking becomes difficult when a thickness of the green sheet is made thin.

Also, the patent article 2 discloses a technique of using a solvent having a high evaporation rate to improve a surface property of the sheet by making the evaporation rate high. However, although the method of making the evaporation rate high is effective to obtain a thick sheet, it gives an adverse effect of deteriorating the surface property in the case of making the sheet thin.

Also, as disclosed in the patent article 3, there is known an invention of regulating a blending composition ratio, a defoaming condition and a drying temperature condition of the sheet by an aqueous coating material.

However, in this technique, a sheet having a desired property may not be able to be obtained due to the limited composition and the procedure becomes cumbersome and complicated because a defoaming step is added.

Furthermore, as disclosed in the patent article 4, there is also known a technique of improving a surface property by extending the sheet by applying pressure.

However, with this technique, the sheet may be damaged due to the applied pressure when the green sheet is made thin.

Patent article 1: The Japanese Unexamined Patent Publication No. 6-206756

Patent article 2: The Patent Publication No. 2866137

Patent article 3: The Japanese Unexamined Patent Publication No. 2000-335971

Patent article 4: The Japanese Unexamined Patent Publication No. 2001-114568

DISCLOSURE OF THE INVENTION

An object of the present invention is to provide a coating material, green sheet and the method capable of producing a green sheet without a pin hole, having enough strength to be peeled from a support body and excellent surface smoothness even when the green sheet is extremely thin, and being suitable to make an electronic device thin and multilayered.

To attain the above object, a green sheet coating material of the present invention is a green sheet coating material comprising ceramic powder, a binder resin including a butyral based resin as a main component thereof, and a solvent, wherein:

the solvent includes a first solvent having an SP value as a solubility parameter of 10 or larger and a second solvent having the SP value of 8 or larger but smaller than 10; and the second solvent is included by 20 to 60 wt % and, preferably, 25 to 60 wt % with respect to 100 wt % of the solvent as the entire weight.

A coating material composition using a butyral based resin includes highly-polar alcohol as the main component due to a problem in solubility of a resin to a solvent. On the other hand, a dispersant used in the coating material according to the present invention exhibits high solubility by the second solvent. Therefore, by adjusting polarity of the solvent so that pigment does not aggregate in the coating material, dispersibility of the pigment improves and a sheet having excellent surface property can be produced.

Namely, by allowing solvent components in the coating material to have a configuration with wide polarity, it becomes possible to strike a balance between solubility of a resin and solubility of a dispersant. As a result, it is possible to attain a coating material having preferable dispersibility both with a resin and pigment, and the surface becomes smooth when made to be a sheet. Also, since the surface roughness of the sheet becomes extremely small comparing with an interlayer thickness, the interlayer thickness can be made thinner (attaining a thin film) and an electronic device can be furthermore multilayered and compact.

For example, a thickness of a dielectric layer after firing (green sheet after firing) can be made as thin as 5 μm or thinner, preferably 3 μm or thinner, and furthermore preferably 2 μm or thinner. Also, the number of layers to be stacked can be increased. Furthermore, short-circuiting and other defectives can be decreased.

Preferably, a weight ratio of the second solvent to the first solvent in the solvent is 0.2 to 2.0, and more preferably 0.5 to 1.5.

When the weight ratio of the second solvent is too low, the surface smoothness declines because solubility of the dispersant to the solvent declines, etc., while when the weight ratio is too high, the surface smoothness tends to decline because solubility of the resin to the solvent declines, etc.

Preferably, the coating material of the present invention furthermore comprises a dispersant, and the dispersant is a polyethylene glycol based nonionic dispersant. Also, preferably, an SP value of the dispersant is 8 to 9. Such a dispersant has good solubility to the second solvent, which results in an improvement of the dispersibility.

Preferably, the first solvent is alcohols and the second solvent includes at least one selected from ketones, esters and aromatic series. In this case, preferably, the first solvent is at least one selected from methanol, ethanol, propanol and butanol, and the second solvent includes at least one selected from methylethyl ketone, methylisobutyl ketone, ethyl acetate, butyl acetate, toluene and xylene.

Preferably, the butyral based resin is a polybutyral resin; and a polymerization degree of the polybutyral resin is 1000 or higher and 1700 or lower, and a butyralization degree of the resin is higher than 64% and lower than 78%, and a residual acetyl group amount is less than 6%.

When a polymerization degree of the polybutyral resin is too low, it is liable that sufficient mechanical strength cannot be obtained when forming a thin layer of, for example, 5 μm or thinner, preferably 3 μm or thinner. While when the polymerization degree is too high, it is liable that the surface roughness is deteriorated when made to be a sheet. When the butyralization degree of the polybutyral resin is too low, solubility to the coating material tends to decline, while when too high, the sheet surface roughness tends to deteriorate. Furthermore, when a residual acetyl group amount is too much, the sheet surface roughness tends to deteriorate.

Preferably, the binder resin is included by 5 parts by weight or more and 6.5 parts by weight or less with respect to 100 parts by weight of the ceramic powder. When the content of the binder resin is too small, it is liable that the sheet strength declines and the stacking property (adhesiveness at the rime of being stacked) deteriorates. While, when the content of the binder resin is too much, segregation of the binder resin arises and the dispersibility tends to deteriorate and the sheet surface roughness tends to decline.

Preferably, a particle diameter of the ceramic powder is 0.01 to 0.5 μm. Making the particle diameter of the powder small contributes to attaining a thinner green sheet. Also preferably, nonvolatile components in the green sheet coating material are 10 to 48 wt %. As the nonvolatile components, ceramic powder, a binder, a plasticizer and a dispersant, etc. may be mentioned.

A production method of a ceramic green sheet according to the present invention comprises the step of preparing the green sheet coating material; and the step of molding a ceramic green sheet by using the green sheet coating material.

A production method of a ceramic green sheet according to the present invention comprises the step of preparing the green sheet coating material;

the step of molding a ceramic green sheet by using the green sheet coating material;

the step of drying the green sheet;

the step of obtaining a green chip by stacking the dried green sheets via internal electrode layers; and the step of firing the green chip.

A green sheet according to the present invention is produced by using the green sheet coating material.

According to the present invention, it is possible to provide a coating material, a green sheet and the method, by which a green sheet without a pin hole having a strength to be peeled from a support body and excellent surface smoothness and being suitable for making an electronic device thinner and multilayered.

BEST MODE FOR CARRYING OUT THE INVENTION

Figure 1:
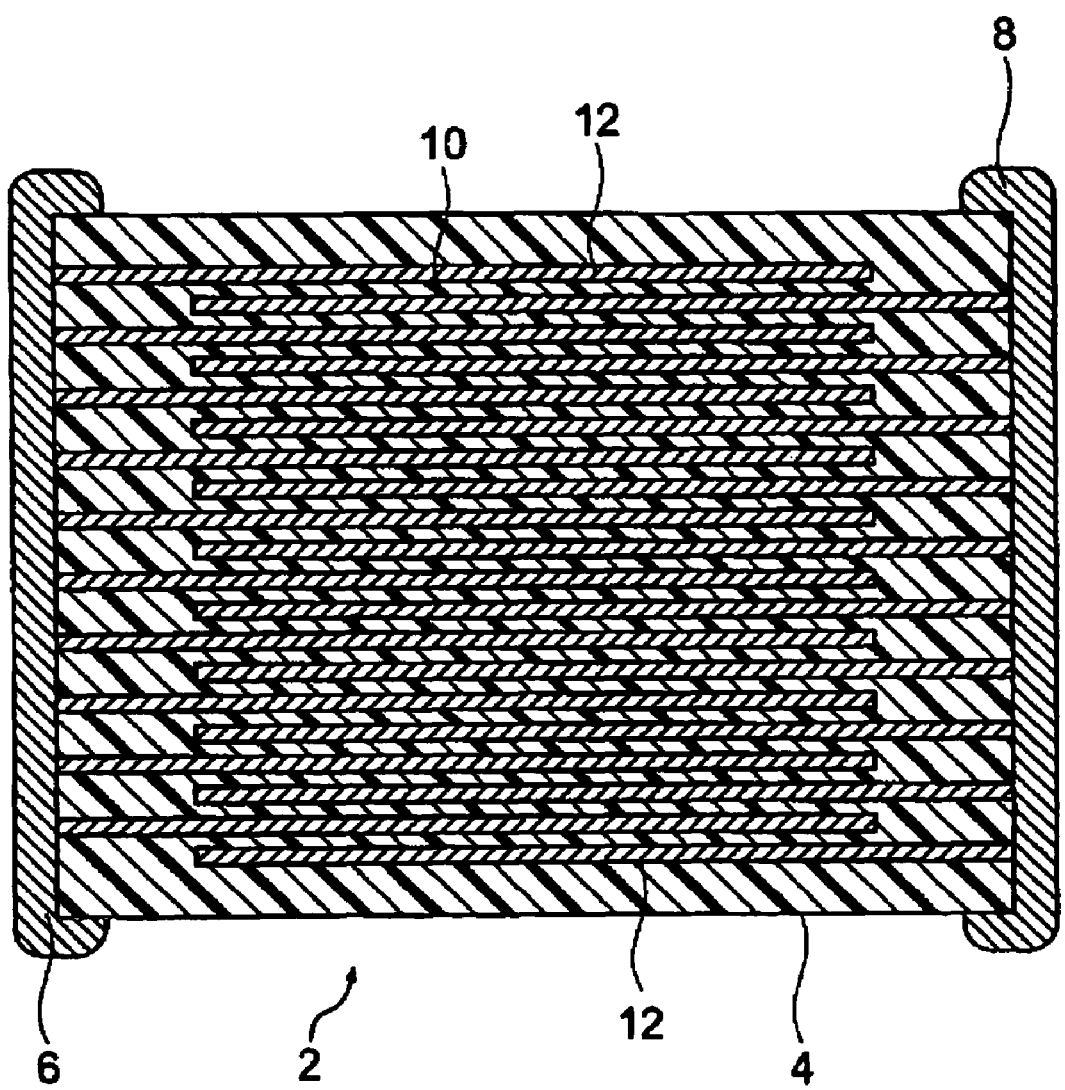
FIG. 1 is a schematic sectional view of a multilayer ceramic capacitor according to an embodiment of the present invention.

Below, the present invention will be explained based on an embodiment shown in the drawings.

First, as an embodiment of an electronic device to be produced by using green sheet coating material (dielectric paste) and a green sheet according to the present invention, an overall configuration of a multilayer ceramic capacitor will be explained.

As shown in FIG. 1, a multilayer ceramic capacitor 2 according to the present embodiment comprises a capacitor element 4, a first terminal electrode 6 and second terminal electrode 8. The capacitor element 4 comprises dielectric layers 10 and internal electrode layers 12, and the internal electrode layers 12 are stacked alternately between the dielectric layers 10. The alternately stacked internal electrode layers 12 on one side are electrically connected to inside of the first terminal electrode 6 formed at one end portion of the capacitor element 4. Also, the alternately stacked internal electrode layers 12 on the other side are electrically connected to inside of the second terminal electrode 8 formed at the other end portion of the capacitor element 4.

A material of the dielectric layer 10 is not particularly limited and composed of a dielectric material, for example, calcium titanate, strontium titanate and/or barium titanate, etc. A thickness of each of the dielectric layers 10 is not particularly limited, but those having a thickness of several $\mu$m to several hundreds of $\mu$m are general. Particularly in the present embodiment, it is made to be thin as preferably 5 $\mu$m or thinner, and more preferably 3 $\mu$m or thinner.

A material of the terminal electrodes 6 and 8 is not particularly limited either, and copper, a copper alloy, nickel and a nickel alloy, etc. are normally used. Silver and an alloy of silver and palladium, etc. may be also used. A thickness of the terminal electrodes 6 and 8 is not particularly limited either, but is normally 10 to 50 $\mu$m or so.

A shape and size of the multilayer ceramic capacitor 2 may be suitably determined in accordance with the object and use. When the multilayer ceramic capacitor 2 has a rectangular parallelepiped shape, it is normally a length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

Next, an example of production methods of the multilayer ceramic capacitor 2 according to the present embodiment will be explained.

(1) First, a dielectric coating material (green sheet coating material) is prepared to produce a ceramic green sheet for composing the dielectric layers 10 shown in FIG. 1 after firing.

The dielectric coating material is composed of an organic solvent based coating material obtained by kneading a dielectric material (ceramic powder) and an organic vehicle.

The dielectric material may be suitably selected from a variety of compounds which become composite oxides or oxides, such as carbonates, nitrites, hydroxides, and organic metal compounds, and mixed for use. The dielectric material is normally used as powder having an average particle diameter of 0.1 to 3 $\mu$m, and preferably 0.4 $\mu$m or smaller. Note that it is preferable to use finer powder than the green sheet thickness to form an extremely thin green sheet.

The organic vehicle is obtained by dissolving a binder resin in an organic solvent. As the binder resin used for the organic vehicle, a polyvinyl butyral resin is used in the present embodiment. A polymerization degree of the polybutyral resin is 1000 or higher and 1700 or lower, and preferably 1400 to 1700. Also, a butyralization degree of the resin is higher then 64% and lower than 78%, and preferably higher than 64% and lower than 70%, and the residual acetyl group amount is smaller than 6% and preferably 3% or smaller.

The polymerization degree of the polybutyral resin can be measured, for example, by a polymerization degree of a polyvinyl acetal resin as a material. Also, the butyralization degree can be measured, for example, based on the JISK6728. Furthermore, the residual acetyl group amount can be measured based on the JISK6728.

When the polymerization degree of the polybutyral resin is too low, it is liable that sufficient mechanical strength is hard to be obtained when made to be a thin film of, for example, 5 $\mu$m or thinner, and preferably 3 $\mu$m or thinner or so. While, when the polymerization degree is too large, surface roughness tends to decline when made to be a sheet. Also, when the butyralization degree of the polybutyral resin is too low, solubility in a coating material tends to decline, while when too high, sheet surface roughness tends to decline. Furthermore, when the residual acetyl group amount is too large, sheet surface roughness tends to decline.

In the present embodiment, an organic solvent to be used for the organic vehicle includes a first solvent having a solubility parameter SP of 10 or larger and a second solvent having a solubility parameter SP of 8 or larger but smaller than 10. In the present invention, an SP value is a value defined by $((\Delta H - RT) \cdot \rho / n)^{1/2}$ based on evaporation heat $\Delta H$ (cal/mol), gas constant R (cal/K·mol), temperature T (K), number of moles n (g/mol) and density $\rho$(g/cm$^3$).

As the first solvent, methanol, ethanol, propanol, butanol and other alcohols may be mentioned. Also, as the second solvent, ketones, esters and aromatic series may be mentioned, wherein methylethyl ketone and methylisobutyl ketone are preferably used as ketones, ethyl acetate and butyl acetate may be mentioned as esters, and toluene and xylene, etc. may be mentioned as aromatic series.

The second solvent is included by 20 to 60 wt %, preferably, 25 to 60 wt % with respect to the total weight 100 wt % of the solvent. Also, a weight ratio of the second solvent to the first solvent in the solvent is preferably 0.2 to 2.0, and more preferably 0.5 to 1.5.

It is preferable that the binder resin is dissolved in an alcohol based solvent and filtered to obtain a solution in advance, their dielectric powder and the other components are added. A binder resin having a high polymerization degree is hard to be dissolved in a solvent, and dispersibility of the coating material tends to decline in a normal method. In a method of the present invention, a binder resin having a high polymerization degree is dissolved in the above good solvent, then, the ceramic powder and other components are added, so that the coating material dispersibility can be improved and arising of insoluble resin can be suppressed. Note that when using the other solvent than the above, it is liable that solid concentration cannot become high and changes of lacquer viscosity over time increase.

In the dielectric coating material, additives selected from a variety of dispersants, plasticizers, antistatic agents, dielectrics, glass flit, and insulators may be included in accordance with need.

In the present embodiment, dispersant is not particularly limited and polyethylene glycol based nonionic dispersant is preferably used, and the hydrophile-lipophile balance (HLB) value is 5 to 6. An SP value of the dispersant is 8 to 9. The dispersant is added preferably by 0.5 part by weight or more and 1.5 parts by weight or less, and more preferably 0.5 part by weight or more and 1.0 part by weight or less with respect to 100 parts by weight of ceramic powder.

When the HLB is out of the above range, it is liable that the coating material viscosity increases and the sheet surface roughness increases. Also, when using the other dispersant than polyethylene glycol based nonionic dispersant, it is not preferable because the coating material viscosity increases, sheet surface roughness increases and sheet elongation declines.

When an adding quantity of the dispersant is too small, the sheet surface roughness tends to increase, while when too large, the sheet tensile strength and stacking property tend to decline.

In the present embodiment, dioctylphthalate is preferably used as a plasticizer and included preferably by 40 parts by weight or more and 70 parts by weight or less and, more preferably, 40 to 60 parts by weight with respect to 100 parts by weight of the binder resin. Comparing with other plasticizer, dioctyl phthalate is preferable both in terms of sheet strength and sheet elongation. It is particularly preferable because the peeling strength from the support body is small. Note that when a content of the plasticizer is too small, the sheet elongation is small and the plasticity tends to be small. While when the content is too large, the plasticizer bleeds out from the sheet to results in arising of segregation of the plasticizer in the sheet, and dispersibility in the sheet tends to decline.

Also, in the present embodiment, water is included by 1 part by weight or more and 6 parts by weight or less, and preferably 1 to 3 parts by weight with respect to 100 parts by weight of the dielectric powder. When the water content is too small, change of coating material characteristics over time due to moisture absorbent becomes large, which is not preferable, and the coating material viscosity tends to increase and filtering characteristics of the coating material tends to deteriorate. While, when the water content is too large, it is liable that separation and precipitation of the coating material arise, dispersibility declines and sheet surface roughness declines.

Furthermore, in the present embodiment, with respect to 100 parts by weight of the dielectric powder, at least any one of a hydrocarbon based solvent, industrial gasoline, kerosene and solvent naphtha by 3 parts by weight or more and 15 parts by weight or less, more preferably 5 to 10 parts by weight are added. By adding these additives, sheet strength and sheet surface roughness can be improved. When adding quantities of the additives are too small, effects of adding become small, while when too much, the sheet strength and sheet surface roughness adversely tend to decline.

The binder resin is included preferably by 5 parts by weight or more and 6.5 parts by weight or less with respect to 100 parts by weight of the dielectric powder. While when the content of the binder resin is too small, it is liable that the sheet strength declines and stacking property (adhesiveness at the time of being stacked) deteriorates. Also, when the binder resin content is too large, segregation of the binder resin arises to deteriorate the dispersibility and the sheet surface roughness tends to decline.

Also, when assuming that the total volume of the ceramic powder, binder resin and plasticizer is 100 volume %, a volume ratio of the dielectric powder is preferably 62.42% or higher and 72.69% or lower, more preferably 63.93% or higher and 72.69% or lower. When the volume ratio is too small, segregation of the binder easily arises to deteriorate the dispersibility and the surface roughness tends to deteriorate. While when the volume ratio is too large, the sheet strength declines and the stacking property tends to decline.

Furthermore, in the present embodiment, the dielectric coating material preferably includes antistatic agent, and the antistatic agent is preferably an imidazoline based antistatic agent. When the antistatic agent is not an imidazoline based antistatic agent, the antistatic effect is small and the sheet strength and sheet elongation degree or adhesiveness tend to decline.

The antistatic agent is preferably included by 0.1 part by weight or more and 0.75 part by weight or less, more preferably 0.25 to 0.5 part by weight with respect to 100 parts by weight of the ceramic powder. When an adding quantity of the antistatic agent is too small, the antistatic effect becomes small, while when too much, it is liable that the sheet surface roughness declines and the sheet strength deteriorates. When the antistatic effect is too small, electrostatic easily arises when peeling the carrier sheet as a supporting body from the ceramic green sheet, and a disadvantage that the green sheet gets wrinkled, etc. easily arises.

Figure 2:
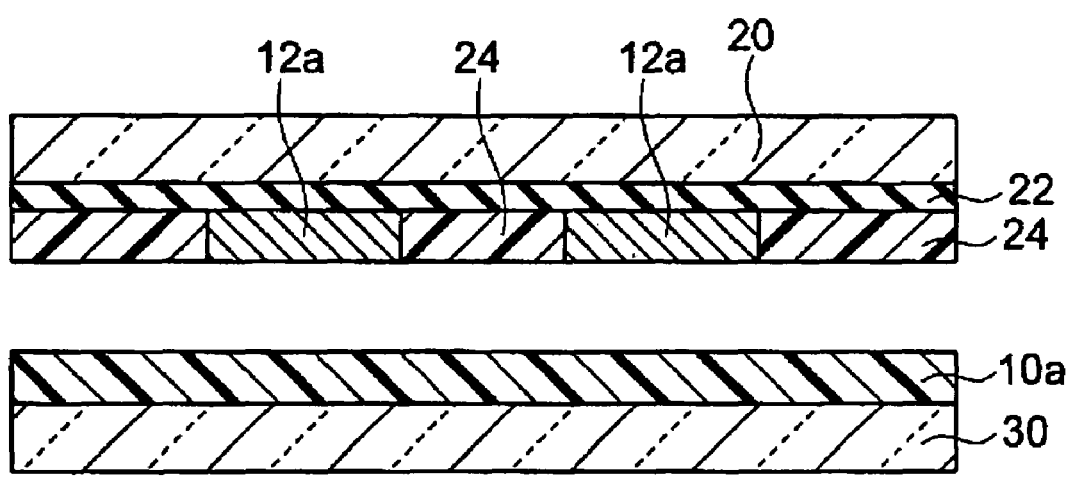
FIG. 2 is a sectional view of a key part showing a production step of the multilayer ceramic capacitor shown in FIG. 1.

By using the dielectric coating material, as shown in FIG. 2, a green sheet 10a is formed to be a thickness of preferably 0.5 to 30 µm, and more preferably 0.5 to 10 µm or so on the carrier sheet 30 as a support body by the doctor blade method, etc. The green sheet 10a is dried after being formed on the carrier sheet 30.

Temperature of drying the green sheet is preferably 50 to 100° C. and drying time is preferably 1 to 20 minutes. A thickness of the green sheet after drying is contracted to 5 to 25% of that before drying. The thickness of the green sheet 10a after drying is preferably 3 µm or less.

(2) As shown in FIG. 2, a carrier sheet 20 is prepared separately from the above carrier sheet 30, and a release layer 22 is formed thereon, and on top thereof, an electrode layer 12a having a predetermined pattern is formed. Next to the electrode layer 12a, on a surface of the release layer 22 where the electrode layer 12a is not formed, a blank pattern layer 24 having substantially the same thickness as that of the electrode layer 12a is formed.

As the carrier sheets 20 and 30, for example, a PET film, etc. is used, and those coated with silicon, etc. are preferable to improve the release property. Thicknesses of the carrier sheets 20 and 30 are not particularly limited and are preferably 5 to 100 µm.

The release layer 22 preferably contains the same dielectric powder as the dielectrics composing the green sheet 10a. Also, the release layer 22 contains a binder, a plasticizer and a release agent other than the dielectric powder. A particle diameter of the dielectric powder may be the same as that of the dielectric particles included in the green sheet but it is preferable to be smaller.

In the present embodiment, a thickness of the release layer 22 is preferably not more than that of the electrode layer 12a, and more preferably, it is set to be a thickness of 60% or thinner, and further preferably 30% or thinner.

A method of applying the release layer 22 is not particularly limited, but it has to be formed to be extremely thin, so that an applying method using, for example, a wire bar coater or a die coater is preferable. Note that adjustment of the release layer 22 thickness can be made by selecting a wire bar coater having a different wire diameter. Namely, to make the thickness of the release layer to be applied thinner, it can be done by selecting one having a small wire diameter, inversely, to form it thick, one with a large wire diameter may be selected. The release layer 22 is dried after being applied. The drying temperature is preferably 50 to 100° C. and the drying time is preferably 1 to 10 minutes.

A binder for the release layer 22 is composed, for example, of an acrylic resin, polyvinyl butyral, polyvinyl acetal, polyvinyl alcohol, polyolefin, polyurethane, polystyrene, or an organic composed of a copolymer of these or an emulsion.

The binder contained in the release layer 22 may be the same as the binder contained in the green sheet 10a or may be different from that, but preferably the same.

A plasticizer for the release layer 22 is not particularly limited and, for example, phthalate ester, dioctyl phthalate, adipic acid, phosphate ester and glycols, etc. may be mentioned. The plasticizer to be contained in the release layer 22 may be the same as that contained in the green sheet or may be different from that.

A release agent for the release layer 22 is not particularly limited and, for example, paraffin, wax and silicone oil, etc. may be mentioned. A release agent contained in the release layer 22 may be the same as that contained in the green sheet or may be different from that.

A binder is contained in the release layer 22 by preferably 2.5 to 200 parts by weight, more preferably 5 to 30 parts by weight, and particularly preferably 8 to 30 parts by weight or so with respect to 100 parts by weight of dielectric particle.

A plasticizer is preferably contained in the release layer 22 by 0 to 200 parts by weight, preferably 20 to 200 parts by weight, and more preferably 50 to 100 parts by weight with respect to 100 parts by weight of the binder.

A release agent is preferably contained in the release layer 22 by 0 to 100 parts by weight, preferably 2 to 50 parts by weight, and more preferably 5 to 20 parts by weight with respect to 100 parts by weight of the binder.

After forming the release layer 22 on the surface of the carrier sheet, an electrode layer 12a to compose an internal electrode layer 12 after firing is formed to be a predetermined pattern on the surface of the release layer 22. A thickness of the electrode layer 12a is preferably 0.1 to 2 µm, and more preferably 0.1 to 1.0 µm or so. The electrode layer 12a may be configured by a single layer or two or more layers having different compositions.

The electrode layer 12a can be formed on the surface of the release layer 22 by a thick film formation method, such as a printing method using an electrode coating material, or a thin film method, such as evaporation and sputtering. When forming the electrode layer 12a on the surface of the release layer 22 by a screen printing method or a gravure printing method as a kind of thick film method, it is as follows.

First, an electrode coating material is prepared. The electrode coating material is fabricated by kneading a conductive material composed of a variety of conductive metals and alloys, or a variety of oxides, organic metal compounds or resinates, etc. to be conductive materials after firing and an organic vehicle.

As a conductive material to be used when producing the electrode coating material, Ni, a Ni alloy, furthermore, a mixture of these are used. A shape of the conductive materials is not particularly limited and may be a spherical shape and scale-like shape, etc. or a mixture of these shapes. Those having an average particle diameter of the conductive material of normally 0.1 to 2 µm, and preferably 0.2 to 1 µm or so may be used.

An organic vehicle contains a binder and a solvent. As the binder, for example, ethyl cellulose, an acrylic resin, polyvinyl butyral, polyvinyl acetal, polyvinyl alcohol, polyolefin, polyurethane, polystyrene, or a copolymer of these may be mentioned. Particularly, butyrals, such as polyvinyl butyral, are preferable.

The binder is contained in the electrode coating material by preferably 8 to 20 parts by weight with respect to 100 parts by weight of the conductive material (metal powder). As a solvent, any of well-known ones, such as terpineol, butylcarbitol and kerosene, may be used. A content of the solvent is preferably 20 to 55 wt % or so with respect to the entire coating material.

To improve the adhesiveness, the electrode coating material preferably contains a plasticizer. As a plasticizer, benzylbutyl phthalate (BBP) and other phthalate esters, adipic acids, phosphoric esters, and glycols, etc. may be mentioned. The plasticizer in the electrode coating material is preferably 10 to 300 parts by weight, and more preferably 10 to 200 parts by weight with respect to 100 parts by weight of the binder. Note that when an adding quantity of the plasticizer or adhesive is too large, it is liable that strength of the electrode layer 12a remarkably declines. Also, to improve transferability of the electrode layer 12a, it is preferable to improve adhesiveness and/or adherence of the electrode coating material by adding a plasticizer and/or adhesive in the electrode coating material.

After or before forming the electrode coating material layer in a predetermined pattern on the surface of the release layer 22 by a printing method, a blank pattern layer 24 is formed to be substantially the same thickness as that of the electrode layer 12a on the surface of the release layer 22 not formed with the electrode layer 12a. The blank pattern layer 24 is composed of the same material as that of the green sheet and formed by the same method. The electrode layer 12a and the blank layer 24 are dried in accordance with need. The drying temperature is not particularly limited, but is preferably 70 to 120° C., and the drying time is preferably 5 to 15 minutes.

(3) After that, the electrode layer 12a is adhered to the surface of the green sheet 10a. For that purpose, the electrode layer 12a and the blank pattern layer 24 are pressed against the surface of the green sheet 10a together with the carrier sheet 20, heated and pressed to transfer the electrode layer 12a and the blank pattern layer 24 to the surface of the green sheet 10a. Note that when seeing from the green sheet side, the green sheet 10a is transferred to the electrode layer 12a and the blank pattern layer 24.

Heating and pressing at the time of transferring may be pressing and heating by a press or by a calendar roll, but is preferably performed by a pair of rolls. The heating temperature and the pressing force are not particularly limited.

By stacking single-layered green sheets each formed with an electrode layer 12a of a predetermined pattern on a green sheet 10a, a multilayer block, wherein a large number of the electrode layers 12a and the green sheet 10a are alternately stacked, is obtained. After that, an outer layer green sheet (a thicker stacked body, wherein a plurality of green sheets each not formed with an electrode layer are stacked) is stacked on the lower surface of the multilayer body. After that, an outer layer green sheet is formed in the same way on the upper side of the multilayer body, then, a final pressing is performed.

Pressure at the time of the final pressing is preferably 10 to 200 MPa. Also, the heating temperature is preferably 40 to 100° C. After that, the multilayer body is cut to be a predetermined size to form green chips. The green chips are subjected to binder removal processing and firing processing, then, thermal treatment is performed in order to re-oxidize the dielectric layer.

The binder removal processing may be performed under a normal condition, but when using a base metal, such as Ni and a Ni alloy, as a conductive material of the internal electrode layer, it is preferably performed under the specific condition below.

temperature rising rate: 5 to 300° C./hour
    holding temperature: 200 to 400° C.
    holding time: 0.5 to 20 hours
    atmosphere: a wet mixed gas of $N_2$ and $H_2$ A firing condition is preferably as below.
temperature rising rate: 50 to 500° C./hour
holding temperature: 1100 to 1300° C.
holding time: 0.5 to 8 hours
cooling rate: 50 to 500° C./hour
atmosphere gas: a wet mixed gas of $N_2$ and $H_2$, etc.

Note that oxygen partial pressure in an atmosphere in the air at firing is preferably $10^{-2}$ Pa or lower. When exceeding the above ranges, the internal electrode layers tend to oxidize, while when the oxygen partial pressure is too low, abnormal sintering is caused in an electrode material of the internal electrode layers to be broken.

The thermal treatment after performing such firing is preferably performed with a holding temperature or highest temperature of 1000° C. or higher, more preferably 1000 to 1100° C. When the holding temperature or the highest temperature at the time of the thermal treatment is lower than the above ranges, it is liable that oxidization of the dielectric material is insufficient to make the insulation resistance lifetime short, while when exceeding the above ranges, Ni in the internal electrode oxidizes and the capacity decreases, moreover, Ni reacts with a dielectric base and the lifetime also tends to become short. The oxygen partial pressure at the time of thermal treatment is higher than that in a reducing atmosphere at the time of firing and is preferably $10^{-3}$ Pa to 1 Pa, and more preferably $10^{-2}$ Pa to 1 Pa. When it is lower than the above range, re-oxidization of the dielectric layers 2 becomes difficult, while when exceeding the above ranges, the internal electrode layers 3 tend to oxidize. Other condition of the thermal treatment is preferably as below.

holding time: 0 to 6 hours
cooling rate: 50 to 500° C./hour
atmosphere gas: a wet $N_2$ gas, etc.

Note that to wet a $N_2$ gas or a mixed gas, etc., for example, a wetter, etc. may be used. In this case, the water temperature is preferably 0 to 75° C. or so. Also, the binder removal processing, firing and thermal treatment may be performed continuously or separately. When performing continuously the preferable way is as follows; (i) the atmosphere is changed without cooling after the binder removal processing, continuously, the temperature is raised to the holding temperature at firing to perform firing. Next, (ii) it is cooled and the thermal treatment is performed by changing the atmosphere when the temperature reaches to the holding temperature of the thermal treatment. On the other hand, when performing them separately, it is preferable that after raising the temperature to the holding temperature at the binder removal processing in an atmosphere of a $N_2$ gas or a wet $N_2$ gas, the atmosphere is changed, and the temperature is furthermore raised. After cooling the temperature to the holding temperature at the thermal treatment, it is preferable that the cooling continues by changing the atmosphere again to a $N_2$ gas or a wet $N_2$ gas. Also, in the thermal treatment, after raising the temperature to the holding temperature under the $N_2$ gas atmosphere, the atmosphere may be changed, or the entire process of the thermal processing may be in a wet $N_2$ gas atmosphere.

The thus obtained sintered body (element body 4) is subjected to end surface polishing, for example, by barrel polishing and sand-blast, etc., then, a terminal electrode coating material is burnt to form terminal electrodes 6 and 8. For example, a firing condition of the terminal electrode coating material is preferably in a wet mixed gas of $N_2$ and $H_2$ at 600 to 800° C. for 10 minutes to 1 hour or so. In accordance with need, soldering, etc. is performed on the terminal electrodes 6 and 8 to form a pad layer. Note that the terminal electrode coating material may be fabricated in the same way as the electrode coating material explained above.

A multilayer ceramic capacitor of the present invention produced as above is mounted on a print substrate, etc. by soldering, etc. and used for a variety of electronic equipments, etc.

In a method of producing a multilayer ceramic capacitor by using the dielectric coating material (green sheet coating material) and the green sheet according to the present embodiment, it becomes possible to produce a green sheet without a pin hole having enough strength to be peeled from a support body and excellent surface smoothness even if the green sheet is extremely thin. For example, a thickness of a dielectric layer after firing (a green sheet after firing) can be made as thin as 5 μm or thinner, preferably 3 μm or thinner, and furthermore preferably 2 μm or thinner. Also, the number of layers to be stacked can be increased. Furthermore, short-circuiting or other defects can be reduced.

Also, in a production method of a multilayer ceramic capacitor by using the dielectric coating material (green sheet coating material) and the green sheet according to the present embodiment, a specific kind of dispersant having a specific range of HLB is used. Therefore, even an extremely thin green sheet of, for example, 5 μm or thinner is strong enough to be peeled from the carrier sheet and has preferable adhesiveness and handlability. Also, surface roughness of the sheet is small and stacking property is excellent. Therefore, it becomes easy to stack a large number of green sheets via electrode layers.

Furthermore, in a production method of a multilayer ceramic capacitor by using the dielectric coating material (green sheet coating material) and the green sheet according to the present embodiment, an antistatic agent is contained in the dielectric coating material, and the antistatic agent is an imidazoline based antistatic agent. Therefore, even in the case of an extremely thin green sheet of, for example, 5 μm or thinner, it is possible to produce a green sheet having sufficient strength to be peeled from the carrier sheet, wherein static electricity generated at the time of being peeled from the carrier sheet is suppressed, and the adhesiveness and handlability are preferable. Also, surface roughness of the sheet is small and stacking property is excellent. Therefore, it becomes easy to stack a large number of green sheets via electrode layers.

Also, in the production method of the multilayer ceramic capacitor according to the present invention, a dry type electrode layer can be transferred easily at high accuracy to a surface of a green sheet without breaking or deforming the green sheet.

Note that the present invention is not limited to the above embodiments and may be variously modified within the scope of the present invention.

For example, a method of the present invention is not limited to the production method of multilayer ceramic capacitors and may be applied as a production method of other multilayer type electronic devices.

EXAMPLES

Below, the present invention will be explained based on further detailed examples, but the present invention is not limited to the examples.

Example 1

Production of Green Sheet Coating Material

As a starting material of ceramic powder, $BaTiO_3$ powder (BT-02 made by Sakai Chemical Industry Co., Ltd.) was used. A ceramic powder subcomponent additives were prepared to satisfy $(Ba_{0.6}Ca_{0.4})SiO_3$: 1.48 parts by weight, $Y_2O_3$: 1.01 parts by weight, $MgCO_3$: 0.72 wt %, $Cr_2O_3$: 0.13 wt % and $V_2O_5$: 0.045 wt % with respect to 100 parts by weight of the $BaTiO_3$ powder.

First, only the subcomponent additives were mixed by a ball-mill to obtain slurry. Namely, the subcomponent additives (total amount 8.8 g), 15 g of a solvent, wherein a ratio of ethanol, n-propanol and xylene is 42.5:42.5:15, a dispersant (0.1 g) and a binder (2 wt % (1.1 g as a lacquer adding quantity) of the subcomponent additives) were preliminary ground by a ball-mill for 20 hours, and preliminary ground slurry was obtained.

Next, with respect to 191.2 g of $BaTiO_3$, the preliminary ground slurry of the subcomponent additives: 24 g, ethanol: 123 g, n-propanol: 123 g, xylene: 56 g, methylethyl ketone: 136 g, mineral spirit: 15 g, a dispersant: 1.4 g, DOP (dioctyl phthalate): 6 g, an imidazoline based antistatic agent: 0.8 g, lacquer of BH-6 (a polyvinyl butyral resin BH-6 made by Sekisui Chemical Co., Ltd. was dissolved in ethanol/n-propanol=1:1): 80 g were mixed by a ball mill for 20 hours to obtain a ceramic coating material (green sheet coating material).

Note that, as a dispersant, a polyethylene glycol based nonionic dispersant (HLB=5 to 6) was used. An SP value of the dispersant is 8 to 9. As a binder, 15% lacquer (BH6 made by Sekisui Chemical Co., Ltd. was dissolved in ethanol/n-propanol=1:1) of BH6 made by Sekisui Chemical Co., Ltd. (polybutyral resin (PVB)) was added as a solid content.

Solvent components in the ceramic coating material include a first solvent composed of ethanol and n-propanol and a second solvent composed of methylethyl ketone and xylene. A weight ratio of the second solvent in the solvent was 36 wt % with respect to 100 wt % as the entire solvent. Note that an SP value of the methylethyl ketone was 9.3 as shown in Table 1. Also, solubility to the polyvinyl butyral resin (PVB) and solubility to the dispersant are shown in Table 1. In Table 1, "o" indicates excellent solubility and "x" indicates being insoluble.

A polymerization degree of the polybutyral resin as a binder resin was 1400, a butyralization degree thereof was 69±3%, and a residual acetyl group amount thereof was 3±2%. The binder resin was contained by 6 parts by weight in the ceramic coating material with respect to 100 parts by weight of ceramic powder (including ceramic powder subcomponent additives). Also, when assuming that the total volume of the ceramic powder, binder resin and plasticizer in the ceramic coating material was 100 volume %, the volume ratio accounted by the ceramics powder was 67.31 volume %.

Also, DOP as a plasticizer was contained in the ceramic coating material by 50 parts by weight with respect to 100 parts by weight of the binder resin. Water was contained by 2 parts by weight with respect to 100 parts by weight of the ceramic powder. The polyethylene glycol based nonionic dispersant as a dispersant was contained by 0.7 part by weight with respect to 100 parts by weight of the ceramic powder.

Also, in the coating material, mineral spirit of at least any one of a hydrocarbon based solvent, industrial gasoline, kerosene and solvent naphtha was added by 5 parts by weight with respect to 100 parts by weight of the ceramic powder.

Viscosity of the coating material was 180 mPa·s. The viscosity of the coating material was measured by using a B-type viscosimeter and using S21 as a rotor, and measurement was made at a temperature of 25° immediately after a drop of the coating material came out from the mill. The rotation rate at the time of measurement was 50 rpm.

Production of Green Sheet

The coating material obtained as above was applied to a PET film as a support film by a wire bar coater and dried, so that a green sheet having a thickness of 1 μm was produced. The applying rate was 50 m/min. and the drying condition was a temperature in the drying furnace of 60° C. to 70° C. and drying time of 2 minutes.

Evaluation of Green Sheet

After that, a degree of brilliancy of the green sheet was measured. The degree of brilliancy was obtained by measuring a degree of brilliancy on the green sheet surface by using VGS-1D made by Nippon Denshoku Co., Ltd. based on the JIS Z-8741 (1983) method 3. The higher a percentage of the degree of brilliance is, the more excellent in surface smoothness is. The results are shown in Table 2. In the measurement of the degree of brilliance, those with 70% or higher were determined to be good (o) and the rest were determined to be defect (x).

TABLE 1

|  |  | Solvent | SP Value | Solubility PVB | Dispersant |
|---|---|---|---|---|---|
| Alcohols | Comparative Example 1 | ethanol | 12.9 | O | X |
|  | Comparative Example 2 | 1-propanol | 11.9 | O | X |
| Ketones | Example 1 | methylethyl ketone | 9.3 | O | O |
|  | Example 2 | methylisobutyl ketone | 8.4 | X | O |
| Esters | Example 3 | ethyl acetate | 9.1 | X | O |
|  | Example 4 | n-butyl acetate | 8.6 | X | O |
| Aromatic Series | Example 5 | toluene | 8.9 | Swollen | O |
|  | Example 6 | xylene | 8.9 | Swollen | O |
|  | Comparative Example 3 | n-heptan | 7.5 | X | O |

TABLE 2

|  |  | Solvent | SP Value | Second Solvent/Entire Solvent Ratio [wt %] | Brilliancy Degree [%] | Evaluation |
|---|---|---|---|---|---|---|
| Alcohols | Comparative Example 1 | ethanol | 12.9 | 12 | 58 | X |
|  | Comparative Example 2 | 1-propanol | 11.9 | 12 | 60 | X |
| Ketones | Example 1 | methylethyl ketone | 9.3 | 36 | 73 | O |
|  | Example 2 | methylisobutyl ketone | 8.4 | 36 | 65 | O |

TABLE 2-continued

| | | Solvent | SP Value | Second Solvent/Entire Solvent Ratio [wt %] | Brilliancy Degree [%] | Evaluation |
|---|---|---|---|---|---|---|
| Esters | Example 3 | ethyl acetate | 9.1 | 36 | 70 | ○ |
| | Example 4 | n-butyl acetate | 8.6 | 36 | 69 | ○ |
| Aromatic Series | Example 5 | toluene | 8.9 | 36 | 74 | ○ |
| | Example 6 | xylene | 8.9 | 36 | 70 | ○ |
| | Comparative Example 3 | n-heptan | 7.5 | 12 | 50 | X |

TABLE 3

| | Middle Polar Solvent | Second Solvent/ Entire Solvent Ratio [wt %] | Second Solvent/ First Solvent [—] | Brilliancy Degree [%] | Evaluation |
|---|---|---|---|---|---|
| Comparative Example 4 | xylene | 15 | 0.18 | 59 | X |
| Example 6 | xylene | 36 | 0.59 | 70 | ○ |
| Example 7 | xylene | 58 | 1.46 | 65 | ○ |
| Comparative Example 5 | xylene | 66 | 2.14 | 55 | X |

Example 2

Other than using methyl isobutyl ketone instead of methylethyl ketone, a green sheet was produced in the same way as in the example 1, and the same evaluation was made. The results are shown in Table 2.

Example 3

Other than using ethyl acetate instead of methylethyl ketone, a green sheet was produced in the same way as in the example 1, and the same evaluation was made. The results are shown in Table 2.

Example 4

Other than using n-butyl acetate instead of methylethyl ketone, a green sheet was produced in the same way as in the example 1, and the same evaluation was made. The results are shown in Table 2.

Example 5

Other than using toluene instead of methylethyl ketone, a green sheet was produced in the same way as in the example 1, and the same evaluation was made. The results are shown in Table 2.

Example 6

Other than using xylene instead of methylethyl ketone, a green sheet was produced in the same way as in the example 1, and the same evaluation was made. The results are shown in Table 2. Note that a weight ratio of the second solvent to the first solvent in the solvent was 0.59 as shown in Table 3.

Comparative Example 1

Other than using ethanol instead of methylethyl ketone and changing the weight ratio of the second solvent to 11 wt % with respect to the entire 100 wt % of the solvent, a green sheet was produced in the same way as in the example 1, and the same evaluation was made. The results are shown in Table 2.

Comparative Example 2

Other than using 1-propanol instead of methylethyl ketone and changing the weight ratio of the second solvent to 11 wt % with respect to the entire 100 wt % of the solvent, a green sheet was produced in the same way as in the example 1, and the same evaluation was made. The results are shown in Table 2.

Comparative Example 3

Other than using n-heptan instead of methylethyl ketone and changing the weight ratio of the second solvent to 11 wt % with respect to the entire 100 wt % of the solvent, a green sheet was produced in the same way as in the example 1, and the same evaluation was made. The results are shown in Table 2.

Example 7

Other than adding the second solvent by 58 wt % with respect to 100 wt % of the solvent as the entire weight and changing the weight ratio of the second solvent to the first solvent in the solvent to 1.46, a green sheet was produced in the same way as in the example 6, and the same evaluation was made. The results are shown in Table 3.

Comparative Example 4

Other than adding the second solvent by 15 wt % with respect to 100 wt % of the solvent as the entire weight and changing the weight ratio of the second solvent to the first solvent in the solvent to 0.18, a green sheet was produced in the same way as in the example 6, and the same evaluation was made. The results are shown in Table 3.

Comparative Example 5

Other than adding the second solvent by 66 wt % with respect to 100 wt % of the solvent as the entire weight and changing the weight ratio of the second solvent to the first solvent in the solvent to 2.14, a green sheet was produced in the same way as in the example 6, and the same evaluation was made. The results are shown in Table 3.

Evaluation

As shown in Tables 2 and Table 3, when the second solvent is added by 20 to 60 wt % and preferably 25 to 60 wt % with respect to 100 wt % of the solvent as the entire weight and a weight ratio of the second solvent to the first solvent in the solvent is 0.2 to 2.0, and preferably 0.5 to 1.5, it was confirmed that a degree of brilliance of the sheet improved and surface smoothness of the sheet improved.

The invention claimed is:

1. A green sheet coating material comprising:
   a solvent, including:
      a first solvent having an SP value as a solubility parameter of 10 or larger; and
      a second solvent having said SP value of 8 or larger but smaller than 10 and constituting 20 to 60 wt % with respect to 100 wt % of said solvent as the entire weight;
   a dispersant consisting only of a polyethylene glycol based nonionic dispersant having a SP value of 8 to 9 and having a hydrophile-lipophile balance (HLB) value of 5 to 6;
   ceramic powder;
   a binder resin including a butyral based resin as a main component thereof;
   a plasticizer; and
   at least any one of a hydrocarbon based solvent, industrial gasoline, kerosene and solvent naphtha;
   wherein:
      the dispersant is added by 0.5 part by weight or more and 1.0 part by weight or less with respect to 100 parts by weight of the ceramic powder;
      said plasticizer comprises dioctylphthalate and is added by 40 parts by weight or more and 70 parts by weight or less with respect to 100 parts by weight of the binder resin; and
      at least any one of said hydrocarbon based solvent, industrial gasoline, kerosene and solvent naphtha is added by 3 parts by weight or more and 15 parts by weight or less with respect to 100 parts by weight of the ceramic powder.

2. The green sheet coating material as set forth in claim 1, wherein a weight ratio of the second solvent to the first solvent in said solvent is 0.2 to 2.0.

3. The green sheet coating material as set forth in claim 1, wherein said first solvent is alcohols and said second solvent includes at least one selected from ketones, esters and aromatic series.

4. The green sheet coating material as set forth in claim 3, wherein said first solvent is at least one selected from methanol, ethanol, propanol and butanol, and said second solvent includes at least one selected from methylethyl ketone, methyl isobutyl ketone, ethyl acetate, butyl acetate, toluene and xylene.

5. The green sheet coating material as set forth in claim 1, wherein:
   said butyral based resin is a polybutyral resin; and
   a polymerization degree of said polybutyral resin is 1000 or higher and 1700 or lower, and a butyralization degree of the resin is higher than 64% and lower than 78%, and a residual acetyl group amount is less than 6%.

6. The green sheet coating material as set forth in claim 1, wherein said binder resin is included by 5 parts by weight or more and 6.5 parts by weight or less with respect to 100 parts by weight of said ceramic powder.

7. The green sheet coating material as set forth in claim 1, wherein a particle diameter of said ceramic powder is 0.01 to 0.5 μm.

8. The green sheet coating material as set forth in claim 1, wherein nonvolatile components in said green sheet coating material is 10 to 48 wt %.

9. A production method of a ceramic green sheet, comprising:
   a step of preparing the green sheet coating material as set forth in claim 1; and
   a step of molding a ceramic green sheet by using said green sheet coating material.

10. A production method of a ceramic green sheet, comprising:
   a step of preparing the green sheet coating material as set forth in claim 1;
   a step of molding a ceramic green sheet by using said green sheet coating material;
   a step of drying said green sheet;
   a step of obtaining a green chip by stacking the dried green sheets via internal electrode layers; and
   a step of firing said green chip.

11. A green sheet produced by using the green sheet coating material as set forth in claim 1.

* * * * *

UNITED STATES PATENT AND TRADEMARK OFFICE
CERTIFICATE OF CORRECTION

PATENT NO. : 7,666,268 B2  Page 1 of 1
APPLICATION NO. : 10/571348
DATED : February 23, 2010
INVENTOR(S) : Kobayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 289 days.

Signed and Sealed this

Seventh Day of December, 2010

David J. Kappos
*Director of the United States Patent and Trademark Office*